US010696777B2

(12) United States Patent
Burdeniuc et al.

(10) Patent No.: US 10,696,777 B2
(45) Date of Patent: *Jun. 30, 2020

(54) ALDEHYDE SCAVENGERS MIXTURES FOR POLYURETHANE FOAMS

(71) Applicant: Evonik Operations GmbH, Essen (DE)

(72) Inventors: Juan Jesus Burdeniuc, Colmar, PA (US); Gauri Sankar Lal, Whitehall, PA (US); Jennifer Elizabeth Antoline Al-Rashid, Allentown, PA (US); Torsten Panitzsch, Henstedt-Ulzburg (DE)

(73) Assignee: Evonik Operations GmbH, Essen (DE)

(*) Notice: Subject to any disclaimer, the term of this patent is extended or adjusted under 35 U.S.C. 154(b) by 107 days.

This patent is subject to a terminal disclaimer.

(21) Appl. No.: 15/183,212

(22) Filed: Jun. 15, 2016

(65) Prior Publication Data
US 2016/0369035 A1    Dec. 22, 2016

Related U.S. Application Data

(60) Provisional application No. 62/180,113, filed on Jun. 16, 2015.

(51) Int. Cl.
C08G 18/08 (2006.01)
C08G 18/18 (2006.01)
C08G 18/32 (2006.01)
C08G 18/34 (2006.01)
C08G 18/48 (2006.01)
C08G 18/66 (2006.01)
C08G 18/76 (2006.01)
C08J 9/00 (2006.01)
C08J 9/12 (2006.01)

(52) U.S. Cl.
CPC .......... C08G 18/089 (2013.01); C08G 18/14 (2013.01); C08G 18/3228 (2013.01); C08G 18/3234 (2013.01); C08G 18/3246 (2013.01); C08G 18/3275 (2013.01); C08G 18/341 (2013.01); C08G 18/4816 (2013.01); C08G 18/4829 (2013.01); C08G 18/4841 (2013.01); C08G 18/6681 (2013.01); C08G 18/7664 (2013.01); C08G 18/7671 (2013.01); C08J 9/0023 (2013.01); C08J 9/0028 (2013.01); C08J 9/12 (2013.01); C08J 2375/08 (2013.01)

(58) Field of Classification Search
CPC .. C08G 18/30; C08G 18/3228; C08G 18/089; C08G 18/14; C08G 18/3234; C08G 18/3246; C08G 18/3275; C08G 18/341; C08G 18/4816; C08G 18/4829; C08G 18/4841; C08G 18/6681; C08G 18/766; C08G 18/7671; C08J 9/0023; C08J 9/0028; C08J 9/12; C08J 2375/08
See application file for complete search history.

(56) References Cited

U.S. PATENT DOCUMENTS

| | | | |
|---|---|---|---|
| 3,565,936 A | 2/1971 | Morehouse et al. | |
| 4,076,654 A * | 2/1978 | Yukuta | C08G 18/166 521/106 |
| 4,107,102 A * | 8/1978 | Dahm | C08G 18/6685 521/163 |
| 4,251,635 A * | 2/1981 | Stone | C08J 9/0023 521/113 |
| 4,269,946 A * | 5/1981 | Sullivan | C08G 18/3234 521/163 |
| 4,292,214 A * | 9/1981 | Blount | C08B 1/08 523/400 |
| 5,328,687 A | 7/1994 | Leung et al. | |
| 5,433,891 A | 7/1995 | Chou et al. | |
| 5,707,435 A | 1/1998 | Halloran et al. | |
| 5,925,687 A * | 7/1999 | Guettes | C08G 18/48 252/182.24 |
| 6,136,876 A * | 10/2000 | Meier | C08G 18/089 521/112 |
| 6,540,936 B1 | 4/2003 | Takagi et al. | |
| 7,879,928 B2 | 2/2011 | Goh et al. | |
| 8,921,471 B2 | 12/2014 | Mulholland | |
| 2003/0144371 A1 | 7/2003 | Kometani et al. | |
| 2005/0159498 A1* | 7/2005 | Bradford | C08J 9/0038 521/107 |
| 2006/0141236 A1 | 6/2006 | Nakamura et al. | |
| 2007/0138671 A1 | 6/2007 | Anastasiou et al. | |
| 2008/0281013 A1 | 11/2008 | Nakamura et al. | |
| 2009/0123680 A1 | 5/2009 | Mahiat et al. | |
| 2009/0227758 A1 | 9/2009 | Miyazaki et al. | |
| 2009/0326089 A1 | 12/2009 | Haas et al. | |

(Continued)

FOREIGN PATENT DOCUMENTS

CN    1800231 A    7/2006
CN    101115793 A    1/2008
(Continued)

OTHER PUBLICATIONS

English-language abstract for KR-20080047884-A obtained from the European Patent Office website on Apr. 12, 2018.*

(Continued)

Primary Examiner — Melissa A Rioja
(74) Attorney, Agent, or Firm — Andrew H. Chung; Linda S. Li; Jason S. Ngui

(57) ABSTRACT

A polyurethane composition comprising a mixture comprising at least two aldehyde scavengers, a polyurethane product, and a process for making polyurethane foam are disclosed. The mixture of scavenger compounds can reduce, if not eliminate, the emissions of aldehydes from polyurethane foams. The scavenger compounds comprise at least one member selected from the group consisting of: phenol or substituted phenol, a 1,3-dicarbonyl compound, a polyamine bearing a 1,3-propanediamino function, melamine, a 1,2-diaminocycloalkane, an ammonium salt, and aminosiloxane.

11 Claims, No Drawings

(56) References Cited

U.S. PATENT DOCUMENTS

| | | | |
|---|---|---|---|
| 2010/0113634 A1* | 5/2010 | Tokumoto | C08G 18/161 521/115 |
| 2011/0009512 A1 | 1/2011 | Grigsby et al. | |
| 2012/0184639 A1 | 7/2012 | Haas et al. | |
| 2012/0261605 A1* | 10/2012 | Glos | C08G 18/3825 252/62 |
| 2012/0264843 A1* | 10/2012 | Glos | C08G 18/092 521/154 |
| 2013/0017359 A1 | 1/2013 | Selley et al. | |
| 2014/0054228 A1 | 2/2014 | Zhang et al. | |
| 2015/0094387 A1 | 4/2015 | Wiltz, Jr. et al. | |
| 2016/0250786 A1 | 9/2016 | Murata et al. | |
| 2016/0304686 A1 | 10/2016 | Otero Martinez et al. | |
| 2018/0017106 A1 | 1/2018 | Vizcarguenaga Vizcarguenaga et al. | |
| 2018/0171064 A1 | 6/2018 | Su et al. | |

FOREIGN PATENT DOCUMENTS

| | | | |
|---|---|---|---|
| CN | 101379176 A | | 4/2009 |
| CN | 104010498 | | 8/2014 |
| CN | 104010498 A | | 8/2014 |
| DE | 102013223441 A1 | | 5/2015 |
| DE | 102013223444 A1 | | 5/2015 |
| EP | 1428847 | | 6/2004 |
| EP | 1685855 A1 | | 8/2006 |
| EP | 1874853 B2 | | 7/2012 |
| GB | 1363069 | | 8/1974 |
| JP | S5732729 A | | 2/1982 |
| JP | H07236687 A | | 9/1995 |
| JP | H10245794 A | | 9/1998 |
| JP | 2000143761 | | 5/2000 |
| JP | 2000143761 A | | 5/2000 |
| JP | 2005194159 A | | 7/2005 |
| JP | 2005206754 A | | 8/2005 |
| JP | 2008280410 A | | 11/2008 |
| JP | 2011012229 A | | 1/2011 |
| JP | 2011038097 A | | 2/2011 |
| JP | 2011515540 A | | 5/2011 |
| JP | 2014201639 A | | 10/2014 |
| KR | 20080047884 A | * | 5/2008 |
| NO | 2015082316 A1 | | 6/2015 |
| WO | 0158976 A1 | | 8/2001 |
| WO | 03016372 A1 | | 2/2003 |
| WO | 03016373 A1 | | 2/2003 |
| WO | 03055930 A1 | | 7/2003 |
| WO | 2004060956 A1 | | 7/2004 |
| WO | 2006116456 A1 | | 11/2006 |
| WO | 2013156237 A2 | | 10/2013 |
| WO | 2014026802 A1 | | 2/2014 |
| WO | 2015050876 A1 | | 4/2015 |
| WO | 2015064084 A1 | | 5/2015 |
| WO | 2015082242 A1 | | 6/2015 |
| WO | 2015082316 A1 | | 6/2015 |

OTHER PUBLICATIONS

Machine translation of the Detailed Description of KR-20080047884-A obtained from the European Patent Office website on Apr. 12, 2018.*

* cited by examiner

ALDEHYDE SCAVENGERS MIXTURES FOR POLYURETHANE FOAMS

This Application claims the benefit of application Ser. No. 62/180,113, filed on Jun. 16, 2015. The disclosure of application Ser. No. 62/180,113 is hereby incorporated by reference.

CROSS REFERENCE TO RELATED PATENT APPLICATIONS

The subject matter of this disclosure is related to commonly owned Application No PCT/CN2015/081524, filed on Jun. 16, 2015. The disclosure of PCT/CN2015/081524 is hereby incorporated by reference.

FIELD OF THE INVENTION

The instant invention relates to compositions for reducing aldehydes, methods for making polyurethane foam and foams having reduced amounts of aldehydes.

BACKGROUND OF THE INVENTION

Polyurethane foam compositions are typically prepared by reacting an isocyanate and a premix which consists of isocyanate-reactive components such as a polyol. The premix optionally also contains other components such as water, flame retardants, blowing agents, foam-stabilizing surfactants, crosslinkers and catalysts to promote the reactions of isocyanate with polyol to make urethane, with water to make $CO_2$ and urea, and with excess isocyanate to make isocyanurate (trimer). The blowing agent in the premix is usually a liquid or gas with a boiling point sufficiently low to be vaporized by the heat released during the polymerization reaction. Examples of blowing agents useful in the production of insulating polyurethane foam include but are not limited to hydrofluorocarbons, hydrochlorocarbons, hydrofluoroolefins, chlorofluoroolefins, hydrochloroolefins, hydrofluorochloroolefins, hydrochlorofluorocarbons, formates, and hydrocarbons. The proper selection and combination of the components in the premix and the isocyanate can be useful for the production of polyurethane foam that is spray applied, poured in place, and used in applications such as refrigerators, freezers, hot water heaters, insulation panels, garage doors, entry doors, and other various applications where insulation is desired.

In the production of a polyurethane molded article the polyisocyanate is reacted with the active hydrogen containing compounds (e.g. polyol, primary or secondary amine, water) such that the number of isocyanate equivalents is approximately equal to the total equivalents of active hydrogen in the mixture.

Increasing concerns regarding the emission of low levels of aldehydes from polyurethane foams has resulted in emission standards by automobile manufacturers. The "Certipur" program has been adopted by the US and European polyurethane manufacturers trade groups to advance the safety, health and environmental performance of polyurethane foams. The limit of formaldehyde emission is 0.1 mg/m when measured using the ASTM method D5116-97 small chamber method with chamber conditioning for 16 h.

Aldehyde exposure limits, including limits specifically for formaldehyde and acetaldehyde, have been assigned by NIOSH and OSHA. These exposure limits are of significant interest to the automobile and slabstock industries in the overall efforts of these industries to enhance the air quality of the auto-cabin and of bedding materials. End users of automobiles and bedding materials may be exposed to VOCs (volatile organic compounds), including aldehydes, that may be emitted from the foams.

Japan Automobile Manufacturers Association (JAMA) has identified several VOCs, including formaldehyde and acetaldehyde, as contributors to foam emissions. Automotive foams may be required to pass heated chamber tests that measure for these aldehydes. Slabstock foam is required to pass the CertiPUR/LGA/-EUROPUR/IKEA tests which measure formaldehyde emissions. Thus there is a need in this art for polyurethane foams and materials used to make such foams that will emit much lower levels of aldehydes.

One example of conventional foam making materials is disclosed in U.S. Pat. No. 6,540,936 B1 that claims the use of polyethylene polyamines adsorbed onto silica as a vehicle for absorbing aldehydes from resin fiber such as polyester, nylon, polyurethanes and other natural and synthetic materials. Since these are solid aldehyde scavengers they cannot be used for production of polyurethane foams because only liquid materials can be pumped and mixed routinely in industrial processes that manufacture polyurethane products. EP 1,428,847B1 describes a process for reducing formaldehyde from polyurethane foams using polymeric substances containing primary and secondary amine groups. In US 2006/0141236 A1 hydrazine containing compounds have been used to reduce formaldehyde and acetaldehyde emission from polyurethane foams. Hydrazines are toxic and explosive limiting their use. A mixture of phenolic and phosphate antioxidants were claimed as compounds which prevent the formation of aldehydes in polyurethane foams and precursors in EP 1,874,853 B2. While these phenolic anti-oxidants prevent formation of aldehyde by oxidation of polyurethane precursors, these anti-oxidants do not remove aldehydes already present in the "pre-mix" solution used for making polyurethane foams. In US 2009/0326089 A1 compounds containing amido and cyano groups in the same molecule were described as formaldehyde scavengers in polyurethane compositions. Large amounts of the claimed molecules are required for the reduction of aldehydes. The combination of a primary amine compound with a tertiary amine catalyst to reduce formaldehyde emission from polyurethane foams is described in US 2011/0009512 A1 but this approach failed to reduce other aldehydes such as acetaldehyde. The industry need is for the reduction of formaldehyde, acetaldehyde, and acrolein emissions. Goh et. al. In U.S. Pat. No. 7,879,928 B2 describes a process for preventing the formation of aldehydic contaminants in polyurethanes and precursor by incorporating a phenolic antioxidant, aminic antioxidant,benzofuran-2-ones and phosphites or phosphonites into the formulation for polyurethane production. Haas et. al. in US 2012/0184639 A1 claimed the reduction of formaldehyde in polyurethane foams using semicarbazide containing compounds. The industry need is for the reduction of formaldehyde, acetaldehyde, and acrolein emissions. WO 2013/156237 A2 describes the use of guanidine containing additives for scavenging formaldehyde from polyurethane systems. Aldehyde scavengers are also disclosed in US 2009/0227758 but has the limitation of needing an additive in both the polyol and isocyanate. WO2015/050876A1 pre-treats and reprocesses the amine catalyst to lower the aldehyde emissions.

The previously identified patents and patent applications are hereby incorporated by reference.

BRIEF SUMMARY OF THE INVENTION

The instant invention can solve problems associated with conventional compositions and methods by providing a mixture of aldehyde scavengers. This invention disclosure relates to aldehyde scavenger compositions useful in the production of low or no aldehyde emission flexible polyurethane foam as well as rigid insulating polyurethane foam produced with systems containing polyether, polyester, Mannich polyols as well as organic-halogen containing flame retardants and blowing agents. This reduced aldehyde emission can be accomplished by incorporating an aldehyde scavenger or scavengers into a "pre-mixed" formulation used for generating the foams. By "low or no emission" it is meant that foam produced by using the inventive scavenger will have either no formaldehyde or acetaldehyde emissions originating from the foam or the formaldehyde emissions will be below about 2 μg/m$^3$ of foam; below about 0.1 μg/m$^3$ foam, below about 1.0 μg/m$^3$ foam, below about 1.5, μg/m$^3$ foam in some cases below about 0.25 μg/m$^3$ foam and the acetaldehyde emission is below about 0.35 μg/m$^3$ foam below about 0.05 μg/m$^3$ foam below about 1.0 μg/m$^3$ foam in some cases below about 2.0 μg/m$^3$ foam; below about when foam samples are tested according to the GM test method GMW 15635-2012 described below. In addition by "low or no emission" it is also meant that foam produced by using the inventive scavenger will have either no formaldehyde or acetaldehyde emissions originating from the foam or the formaldehyde emissions will be below about 165 μg/m$^3$; below about 1.0 μg/m$^3$, below about 50 μg/m$^3$, below about 75, μg/m$^3$ foam in some cases below about 25 μg/m$^3$ foam and the acetaldehyde emission is below about 82 μg/m$^3$ below about 2 μg/m$^3$ below about 50 μg/m$^3$ in some cases below about 40 μg/m$^3$; when foam samples are tested according to the 10 L bag method (Q/BYD-1901.771-2012 (BYD) or (NES 0402 method #2) described below. In this disclosure "μg/m$^3$" and "ug/m$^3$" are used interchangeably and mean micrograms of aldehyde per cubic meter (m3) of gas). By "mixture" it is meant that two or more aldehyde scavengers are blended, mixed or otherwise combined such that each of the aldehyde scavengers remains detectable in the mixture (e.g., the mixture can comprise unreacted scavengers or a reaction product of the scavengers as well as unreacted scavengers). Without wishing to be bound by any theory or explanation it is believed that the inventive aldehyde scavenger mixture can interact or react with the aldehyde thereby either converting the aldehyde into another material or entrapping the aldehyde within the foam.

One aspect of the invention relates to an aldehyde scavenger comprising a mixture of at least two members selected from the group consisting of:
a) Phenol or substituted phenol.
b) A 1,3-dicarbonyl compound.
c) A polyamine bearing a 1,3-propanediamino function.
d) Melamine
e) A 1,2-diaminocycloalkane
f) An ammonium salt; and
i) aminosiloxane Another aspect of the invention relates to combinations of aldehyde scavengers selected from the above list as follows:
A mixture of two aldehyde scavengers of the following combinations:
1. A mixture of phenol or substituted phenol with a 1,3 dicarbonyl compound.
2. A mixture of phenol or substituted phenol with a compound bearing a 1,3-propanediamino function.
3. A mixture of phenol or substituted phenol with melamine.
4. A mixture of phenol or substituted phenol with a 1,2-diaminocyclohexane.
5. A mixture of phenol or substituted phenol with an ammonium salt.
6. A mixture of a 1,3-dicarbonyl compound with a 1,3-propanediamino function.
7. A mixture of a 1,3-dicarbonyl compound with a melamine.
8. A mixture of a 1,3-dicarbonyl compound with a 1,2-diaminocyclohexane.
9. A mixture of a 1,3-dicarbonyl compound with an ammonium salt.
10. A mixture of a compound bearing a 1,3-propanediamino function and melamine.
11. A mixture of a compound bearing a 1,3-propanediamino function and a 1,2-diaminocyclohexane.
12. A mixture of a compound bearing a 1,3-propanediamino function and an ammonium salt.
13. A mixture of melamine with a 1,2-diaminocyclohexane.
14. A mixture of melamine with an ammonium salt.
15. A mixture of a 1,2-diaminocyclohexane with an ammonium salt
16. A mixture of phenol or substituted phenol with aminosiloxane.
17. A mixture of a 1,3-dicarbonyl compound with a aminosiloxane.
18. A mixture of a compound bearing a 1,3-propanediamino function and am inosiloxane.
19. A mixture of melamine with aminosiloxane.
20. A mixture of a 1,2-diaminocyclohexane with aminosiloxane
21. A mixture of an ammonium salt with aminosiloxane.

A mixture of three aldehyde scavengers of the following combinations:
1. A mixture of phenol or substituted phenol with a 1,3 dicarbonyl compound and a compound bearing a 1,3-propanediamino function.
2. A mixture of phenol or substituted phenol with a 1,3 dicarbonyl compound and melamine
3. A mixture of phenol or substituted phenol with a 1,3-dicarbonyl compound and a 1,2-diaminocyclohexane.
4. A mixture of phenol or substituted phenol with a 1,3-dicarbonyl compound and an ammonium salt.
5. A mixture of phenol or substituted phenol with a compound bearing a 1,3-propanediamino function and melamine.
6. A mixture of phenol or substituted phenol with a compound bearing a 1,3-propanediamino function and a 1,2-diamocyclohexane.
7. A mixture of phenol or substituted phenol with a compound bearing a 1,3-propanediamino function and an ammonium salt.
8. A mixture of phenol or substituted phenol with melamine and a 1,2-diaminocyclohexane.
9. A mixture of phenol or substituted phenol with melamine and an ammonium salt.
10. A mixture of phenol or substituted phenol with a 1,2-diaminocyclohexane and an ammonium salt.
11. A mixture of a 1,3-dicarbonyl compound with a compound bearing the 1,3-propanediamino function and melamine.
12. A mixture of a 1,3-dicarbonyl compound with a compound bearing the 1,3-propanediamino and a 1,2-diaminocyclohexane.
13. A mixture of a 1,3-dicarbonyl compound with a compound bearing the 1,3-propanediamino and an ammonium salt.

14. A mixture of a 1,3-dicarbonyl compound with melamine and a 1,2-diaminocyclohexane.
15. A mixture of a 1,3-dicarbonyl compound with melamine and an ammonium salt.
16. A mixture of a 1,3-dicarbonyl compound with a 1,2-diaminocyclohexane and an ammonium salt.
17. A mixture of a compound bearing the 1,3-propanediamino function with melamine and a 1,2-diaminocyclohexane.
18. A mixture of a compound bearing the 1,3-propanediamino function with melamine an ammonium salt.
19. A mixture of a compound bearing the 1,3-propanediamino function with a 1,2-diaminocyclohexane and an ammonium salt.
20. A mixture of melamine with a 1,2-diaminocyclohexane and an ammonium salt.
21. A mixture of phenol or substituted phenol with a 1,3 dicarbonyl compound and aminosiloxane.
22. A mixture of a 1,3-dicarbonyl compound with a compound bearing the 1,3-propanediamino function and aminosiloxane.
23. A mixture of a compound bearing the 1,3-propanediamino function with melamine and aminosiloxane.
24. A mixture of melamine with a 1,2-diaminocyclohexane and aminosiloxane A mixture containing four aldehyde scavengers of the following combinations:
1. A mixture of phenol or substituted phenol with a 1,3 dicarbonyl compound, a compound bearing a 1,3-propanediamino function and melamine.
2. A mixture of phenol or substituted phenol with a 1,3 dicarbonyl compound, a compound bearing a 1,3-propanediamino function and a 1,2-diamincyclohexane.
3. A mixture of phenol or substituted phenol with a 1,3 dicarbonyl compound, a compound bearing a 1,3-propanediamino function and an ammonium salt.

Another aspect of the invention relates to a composition comprising a mixture of at least two aldehyde scavengers in combination with at least one other compound used for making a polyurethane. For example, the inventive aldehyde scavenger mixture can be combined with at least one of a pre-mix comprising a polyol, and in some cases a pre-mix comprising an isocyanate compound. Preferably the aldehyde scavenger is non-reactive with non-aldehyde compounds used for making polyurethane.

One aspect of the invention relates to a composition comprising a mixture of at least two aldehyde scavengers, at least one catalyst and optionally at least one diluent.

One aspect of the invention relates to producing polyurethane foam by using a polyurethane formulation comprising the following components:
1. A mixture comprising at least two aldehyde scavenger which may be one of the following compounds or combination of compounds:
   a. Phenol or substituted phenol
   b. 1,3-dicarbonyl compound
   c. A polyamine bearing a 1,3-propanediamino function.
   d. Melamine
   e. A 1,2-diaminocycloalkane
   f. An ammonium salt; and
   g. aminosiloxane
2. At least one polyol
3. Compounds containing isocyanate reactive hydrogen atoms.
4. Water and other foaming agents
5. Catalysts
6. Surface active agents
7. Additives, pigments or flame retardant
8. A diisocyanate or polyisocyante compound The aldehyde scavenger mixture is normally a liquid under ambient conditions. The aldehyde scavenger mixture can comprise about 0.05 pphp to about 2.0 pphp, about 1 pphp to about 2 pphp and about 1.5 pphp to about 2.0 pphp of a pre-mix composition.

One aspect of the invention relates to a composition comprising a mixture of at least two aldehyde scavengers, at least one polyol, water and at least one amine catalyst.

Another aspect of the invention relates to the foregoing aspects wherein the aldehyde scavenger mixture comprises at least two members selected from the group consisting of phenol or substituted phenol compounds, a 1,3-dicarbonyl compound, a polyamine bearing a 1,3-propanediamino function, melamine, a 1,2-diaminocycloalkane, an ammonium salt, and an aminosiloxane.

Another aspect of the invention relates to any of the foregoing aspects wherein the aldehyde scavenger mixture comprises at least one member selected from the group consisting of phenol, cardanol, 2-methylphenol, 4-methylphenol, 4-t-butylphenol, 2-methoxyphenol, 4-methoxyphenol, trihydroxybenzene (phloroglucinol) and 4-nonylphenol.

Another aspect of the invention relates to any of the foregoing aspects wherein the aldehyde scavenger mixture comprises at least one member selected from the group consisting of diethyl malonate, dimethyl malonate, 2,4-pentanedione, 1,3-cyclohexanedione malonamide, and N,N,N'N'-tetramethylmalonamide.

Another aspect of the invention relates to any of the foregoing aspects wherein the aldehyde scavenger mixture comprises at least one member selected from the group consisting of propanediamine, 1-Benzyl-1,3-propanediamine, isotridecyloxypropyl-1,3-diaminopropane, dodecyloxypropyl-1,3-diaminopropane, and hexyloxypropyl-1,3-diaminopropane, 1,3-propanediamine, and "$^1$-(2-(3-aminopropylamino)-ethyl)-propane1,3-diamine, N,N',N"-Tris-(3-aminopropyl)-4-aminopropyl-1,8-octanediamine and N,N'-Bis-(3-aminopropyl)-propane1,3-diamine, $N^1$-{2-[2-(3-Amino-propylamino)-ethylamino]-ethyl}-propane-1, 3-diamine and $N^1$-[2-(3-Amino-propylamino)-ethyl]-propane-1,3-diamine Another aspect of the invention relates to any of the foregoing aspects wherein the aldehyde scavenger comprises at least one member selected from the group consisting of propanediamine, 1,3-propanediamine, and $N^1$-(2-(3-aminopropylamino)-ethyl)-propane1,3-diamine, N,N',N"-Tris-(3-aminopropyl)-4-aminopropyl-1,8-octanediamine and N,N'-Bis-(3-aminopropyl)-propane1,3-diamine, $N^1$-{2-[2-(3-Amino-propylamino)-ethylamino]-ethyl}-propane-1, 3-diamine and $N^1$-[2-(3-Amino-propylamino)-ethyl]propane-1,3-diamine.

Another aspect of the invention relates to any of the foregoing aspects wherein the aldehyde scavenger mixture comprises melamine.

Another aspect of the invention relates to any of the foregoing aspects wherein the aldehyde scavenger mixture comprises 1,2-diaminocyclohexane.

Another aspect of the invention relates to any of the foregoing aspects wherein the aldehyde scavenger mixture comprises at least one member selected from the group consisting of ammonium carbonate, ammonium chloride, and ammonium nitrate.

Another aspect of the invention relates to any of the foregoing aspects and further comprising at least one diluent.

One aspect of the invention relates to a composition comprising any of the foregoing aldehyde scavenger mixture compositions, at least one amine catalyst and at least one diluent.

One aspect of the invention relates to a method for producing polyurethane foam, the method comprising contacting and reacting at least one polyol and at least one diisocyanate in the presence of: 1) at least one blowing agent, 2) at least one amine catalyst, and 3) any of the foregoing mixture compositions.

Another aspect of the invention relates to a method for producing polyurethane foam, the method comprising reacting combining 1) at least one polyol, 2) at least one blowing agent, 3) at least one amine catalyst, and 4) any of the foregoing mixture compositions and contacting with at least one polyisocyanate thereby reacting the polyol and polyisocyanate to produce the polyurethane foam.

A further aspect of the invention relates to a polyurethane foam produced by any of the foregoing methods.

Another aspect of the invention relates to any of the foregoing polyurethane foams wherein the foam comprises a low emission foam.

Another aspect of the invention relates to any of the foregoing polyurethane foams wherein the foam comprises a no emission foam.

A further aspect of the invention relates to the use of any of the foregoing compositions for producing a polyurethane foam.

The various aspects and embodiments of the invention can be used alone or in combinations with each other.

DETAILED DESCRIPTION OF THE INVENTION

Provided is an inventive process, a polyurethane composition, a polyurethane product, and a process for making polyurethane foam. Embodiments of the present disclosure can reduce the emission of aldehydes from polyurethane foams by incorporating a mixture of aldehyde scavengers into the formulation to produce the foams as described above. These compounds are demonstrated to significantly reduce, if not eliminate, the emissions of aldehydes from these foams and in some cases have met or exceeded the Industry emission standards.

The inventive scavengers are useful for the production of a wide range of foams including rigid insulating foam, and are particularly useful for spray applied foam, appliance insulation, insulating construction panels, and various other insulation products containing closed-cell rigid polyurethane foam. This invention includes foams that have an isocyanate index between about 20 and about 500, about 50 to about 270 and typically about 70 to about 150. The invention includes polyols having an OH number of about 5 to about 600, about 100 to about 600 and in some cases about 50 to about 100.

The scavenger mixtures described in this invention could be used in combination with any suitable halogen-containing blowing agent. Examples of blowing agents useful in the production of insulating polyurethane foam include but are not limited to hydrofluorocarbons, hydrochlorocarbons, hydrofluoroolefins, hydrochloroolef ins, hydrofluorochloroolef ins, hydrochlorofluorocarbons, formates, and hydrocarbons. Examples of hydrohaloolefin blowing agents are HFO-1234ze (trans-1,3,3,3-Tetrafluoroprop-1-ene), HFO-1234yf (2,3,3,3-Tetrafluoropropene) and HFO-1233zd (1-Propene,1-chloro-3,3,3-trifluoro), among other HFOs. The amount of blowing agent can range from about 0.5 pphp to about 5 pphp, about 5 pphp to about 20 pphp and in some cases about 20 pphp to about 50 pphp.

One aspect of the invention is useful for the production of flexible polyurethane foam with low or no aldehyde emissions for use in automotive applications such as car seating, arm rest, head rest, steering wheel and various other products having an open celled flexible foam. This invention includes foams that have an isocyanate index between about 60 and about 200, about 70 to about 180 and typically about 70 to about 150. The invention includes polyols having an OH number of about 5 to about 600. Typically flexible foams are produced using a blowing agent comprising or consisting essentially of water.

In one embodiment the aldehyde scavenger mixture 1a, comprises a phenol or substituted phenol, (from the list above) is represented by the structure below:

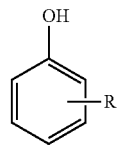

R=substituent(s) on the phenol. This may be H, OH, alkyl of 1-20 carbon atoms, alkyl groups bearing heteroatoms such as N, S, O. The substituents may be at the otho, meta or para position relative to the OH group. Phenolic antioxidants with hindered butyl alkyl groups adjacent to the hydroxyl group such as butylated hydroxyl toluene and butylated hydroxyl anisole are not claimed in this embodiment.

Examples of compounds of this type comprise at least one member selected from the group consisting of phenol, cardanol, 2-methylphenol, 4-methylphenol, 4-t-butylphenol, 2-methoxyphenol, 4-methoxyphenol, and 4-nonylphenol. Preferred compounds are cardanol, 4-t-butylphenol and 4-nonylphenol, trihydroxybenzene (phloroglucinol). Most preferred are cardanol, phloroglucinol, and 4-nonylphenol.

Another embodiment the aldehyde scavenger mixture comprises a 1,3-dicarbonyl. Such compounds of 1b may be represented by the chemical structure shown below:

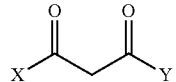

X,Y=alkyl, aryl, $NR_2$ (R=H, alkyl, aryl). The 1,3-dicarbonyl group can also be contained in a five or six membered ring. Examples of such compounds comprise at least one member selected from the group consisting of diethyl malonate, dimethyl malonate, 2,4-pentanedione, 1,3-cyclohexanedione malonamide, N,N,N'N'-tetramethylmalonamide.

Preferred 1,3-dicarbonyl compounds are 2,4-pentanedione and 1,3-cyclohexanedione. Most preferred is 1,3-cyclohexanedione.

In another embodiment the aldehyde scavenger mixture comprises at least one polyamine of 1c bearing a 1,3-propanediamino function. This may be represented by the structures below:

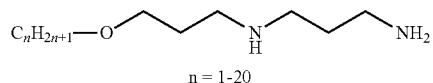

n = 1-20

-continued

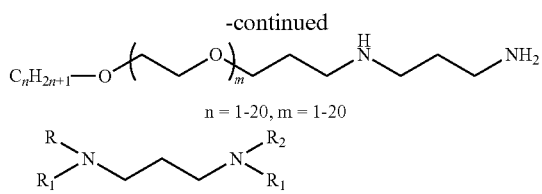

n = 1-20, m = 1-20

R, R1, may be H, alkyl or aryl alkyl groups. R2 and R3 may be alkyl or aryl groups. There may be multiple 1,3-propane amine groups in the same molecule such as the structures below:

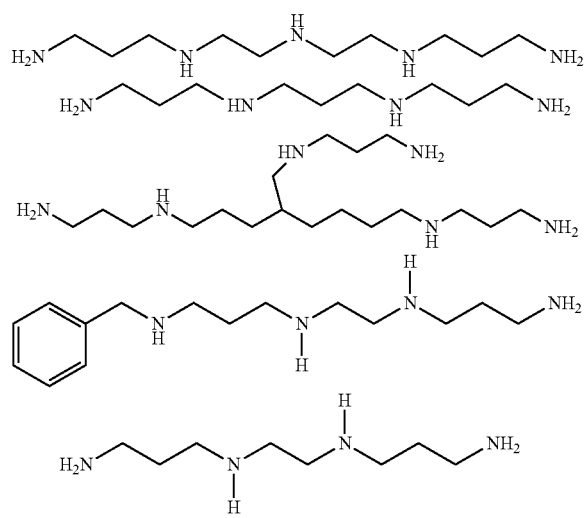

Examples of such polyamines of 1c comprise at least one member selected from the group 1-Benzyl-1,3-propanediamine, isotridecyloxypropyl-1,3-diaminopropane, dodecyloxypropyl-1,3-diaminopropane, and hexyloxypropyl-1,3-diaminopropane. The preferred 1,3-propanediamino compounds are 1-Benzyl-1,3-propanediamine, isotridecyloxypropyl-1,3-diaminopropane, dodecyloxypropyl-1,3-diaminopropane, and hexyloxypropyl-1,3-diaminopropane, N,N',N"-Tris-(3-aminopropyl)-4-aminopropyl-1,8-octanediamine and N,N'-Bis-(3-aminopropyl)-propane1,3-diamine, $N^1$-{2-[2-(3-Amino-propylamino)-ethylamino]-ethyl}-propane-1,3-diamine and $N^1$-[2-(3-Amino-propylamino)-ethyl]-propane-1,3-diamine The most preferred 1,3-propanediamino compounds are isotridecyloxypropyl-1,3-diaminopropane, N,N',N"-Tris-(3-aminopropyl)-4-aminopropyl-1,8-octanediamine, N,N'-Bis-(3-aminopropyl)-propane1,3-diamine, $N^1$-{2-[2-(3-Amino-propylamino)-ethylamino]-ethyl}-propane-1,3-diamine and $N^1$[2-(3-Amino-propylamino)-ethyl]propane-1,3-diamine.

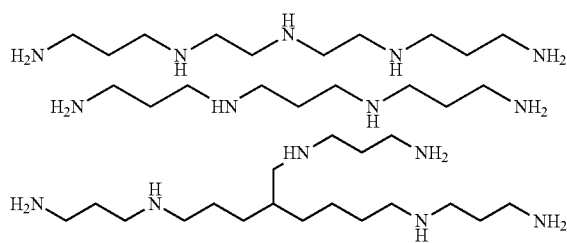

In another embodiment the scavenger mixture comprises a Melamine (1d).

In another embodiment the scavenger mixture comprises 1,2-diaminocyclohexane (1e).

The aldehyde scavenger mixture may comprise an ammonium salt (1f). Examples of these include ammonium carbonate, ammonium chloride, ammonium nitrate. The most preferred ammonium salt is ammonium carbonate.

In another embodiment, the aldehyde scavenger mixture comprises at least one aminosiloxane as well as alkanolaminosiloxanes. Aminosiloxane and alkanolaminosiloxanes are described in the prior in the following documents US2013/0017359 A1, U.S. Pat. No. 5,707,435, GB1363069, U.S. Pat. No. 3,565,936 and US 2014/0054228 A1; hereby incorporated by reference. Examples of aminosiloxanes comprise at least one member selected from the group consisting of N-(2-aminoethyl)-3-aminopropyl trimethoxysilane, N-(aminoethylaminomethyl)phenyltrimethoxysilane, N-(2-aminoethyl)-3-aminopropyltris (2-ethylhexoxy)-silane, 3-aminopropyltrimethyxysilane, trimethoxysilylpropyldiethylenetriamine, bis(2-hydroxyethyl)-3-aminopropyltrimethoxysilane and the like.

In one embodiment, the invention relates to a premix that comprises a mixture comprising at least two aldehyde scavengers, polyol component, at least one surfactant component, at least one blowing agent component, and at least one crosslinking component. The polyols component comprises one or more standard polyols, one or more natural oil polyols, one or more polyester polyols, one or more Mannich polyols or combinations thereof. Mannich bases are obtained by the condensation reaction of: 1) carbonylic compound, 2) a primary or secondary amine and 3) organic compound with enolizable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. The total amount of scavenger can range from about 0.001 to about 5 pphp. The ratio of the two aldehyde scavengers to each other can range from about 0.1 to about 10. The amount of polyol can range from about 80 pphp to about 100 pphp about 80 pphp to about 50 pphp and in some cases about 50 pphp to about 10 pphp. The amount of surfactant can range from about 0.10 pphp to about 10 pphp, about 0.20 pphp to about 8.0 pphp and in some cases about 0.5 pphp to about 3.0 pphp. The blowing agent components can range from about 1 pphp to about 30 pphp, about 5 pphp to about 20 pphp and in some cases about 8 pphp to about 15 pphp. The crosslinking component can range from about 0.20 pphp to about 10 pphp, about 0.5 pphp to about 5 pphp and in some cases about 0.5 pphp to about 3.0 pphp. The premix can be formed by using any suitable conditions such as mixing all the components in a reaction vessel equipped with a mechanical agitator or simply mixing all the premix components in a drum and mechanically mixing the components inside the drum before sealing.

In one embodiment, the standard polyol includes polyether polyol. In one embodiment the standard polyol is used in the range about 0 pphp to about 100 pphp, about 0 pphp to about 80 pphp and in some cases about 20 pphp to about 60 pphp. In one embodiment, the natural oil polyol is at an amount of greater than about 0 to about 40 pphp, greater than about 0 to about 20 pphp and in some cases greater than about 0 pphp to about 10 pphp. In one embodiment, the standard polyol is used alone and it is a polyester polyol. In one embodiment, the polyester polyol is used at an amount of about 0 pphp to 100 pphp, about 10 pphp to about 80 pphp and in some cases about 20 pphp to about 60 pphp. In one embodiment the Mannich polyol is used in combination with other polyol and in a range from 0 pphp to 80 pphp, about 0 pphp to about 50 pphp and in some cases about 0 pphp to about 20 pphp.

In one embodiment, the premix further comprises at least one of water, cell stabilizers, chain extenders, pigments, fillers, flame retardants, auxiliary urethane gelling catalysts, auxiliary urethane blowing catalysts, transition metal catalysts, or combinations thereof. The amount of the foregoing can range from about 0.1 pphp to about 10 pphp, about 10 pphp to about 30 pphp and in some cases about 30 pphp to about 50 pphp. As is described below, in some embodiments, the premix includes further components that are combined through any suitable equipment and procedures including those previously described and/or at any suitable portion of the process.

The inventive pre-mix can comprise any suitable cell stabilizers include, but are not limited to, silicone surfactants, anionic surfactants, or combinations thereof. In one embodiment, the cell stabilizer is the silicone surfactant, such as, polyalkylsiloxane, polyoxyalkylene polyol-modified dimethylpolysiloxane, alkylene glycol-modified dimethylpolysiloxane, or combinations thereof. In one embodiment, the cell stabilizer is the anionic surfactant, such as, a salt of a fatty acid, a salt of a sulfuric acid ester, a salt of a phosphoric acid ester, a salt of a sulfonic acid, or a combination thereof.

In one embodiment, the premix includes the cell stabilizers at a suitable predetermined amount. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like. Suitable predetermined amounts for all cell stabilizers include, but are not limited to, about 0.1 pphp to about 20 pphp, 0.1 pphp to about 10 pphp, 0.1 pphp to about 5 pphp, or any suitable combination or sub-combination thereof.

The inventive pre-mix can comprise at least one crosslinking agent. Suitable crosslinking agents (forming part of or all of crosslinking) include, but are not limited to, low-molecular weight compounds containing at least two isocyanate reactive moieties, such as, hydroxyl groups, primary amino groups, secondary amino groups, other active hydrogen-containing groups that are reactive with an isocyanate group, or combinations thereof. In one embodiment, the crosslinking agent is a polyhydric alcohol (for example, a trihydric alcohol, such as, glycerol or trimethylolpropane), a polyamine, or a combination thereof. In one embodiment with the crosslinking agent being a polyamine, the crosslinking agent is diethyltoluenediamine, chlorodiaminobenzene, diethanolamine, diisopropanolamine, triethanolamine, tripropanolamine, 1,6-hexanediamine, or combinations thereof. In one embodiment with the crosslinking agent being a diamine, the crosslinking agent includes twelve or fewer carbon atoms, seven carbon atoms, or less than seven carbon atoms. The amount of crosslinking agent can range from about 0.20 pphp to about 10 pphp, about 0.5 pphp to about 5 pphp and in some cases about 0.5 pphp to about 3.0 pphp.

The inventive pre-mix can comprise at least one chain extender. Suitable chain extenders include, but are not limited to, compounds having a hydroxyl or amino functional group, such as, glycols, amines, diols, water, or combinations thereof. In one embodiment, the chain extender is ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminothane, 2,4-toluenediamine, or combinations thereof. The amount of chain extenders can range from about 0.20 pphp to about 10 pphp, about 0.5 pphp to about 5 pphp and in some cases about 0.5 pphp to about 3.0 pphp.

The inventive pre-mix can comprise at least one pigment. Suitable pigments include, but are not limited to, organic pigments, inorganic pigments, or combinations thereof. The pigments permit coloring (for example, to match a color grade), concealing (for example, to conceal yellowing), or combinations thereof. In one embodiment with the pigment being an organic pigment, the pigment is an azo/diazo dye, a phthalocyanine, dioxazine, carbon black, or combination thereof. In one embodiment with the pigment being an inorganic pigment, the pigment is titanium dioxide, iron oxide, chromium oxide, or a combination thereof. The amount of pigment can range from about 0 pphp to about 10 pphp, about 0 pphp to about 5 pphp and in some cases about 0.1 pphp to about 3.0 pphp.

The inventive pre-mix can comprise at least one filler. Suitable fillers increase the density and load bearing properties of polyurethane foams. In one embodiment, the filler is barium sulfate, calcium carbonate, or a combination thereof. The amount of filler can range from about 0 pphp to about 20 pphp, about 0 pphp to about 10 pphp and in some cases about 1.0 pphp to about 5.0 pphp.

The inventive pre-mix can comprise at least one flame retardant. Suitable flame retardants reduce the flammability of polyurethane foams. In one embodiment, the flame retardant is a chlorinated phosphate ester, chlorinated paraffin, a melamine powder, or a combination thereof. In one embodiment, the premix includes the flame retardants at any suitable amount. Suitable amounts include, but are not limited to, about 0 pphp to about 30 pphp, about 0 pphp to about 20 pphp, about 0 pphp to about 10 pphp, about 1 pphp to about 20 pphp, about 1 pphp to about 10 pphp, about 1 pphp to about 5 pphp, or any suitable combination or sub-combination thereof.

In one embodiment, the composition produced is the polyurethane composition. In this embodiment, the process involves reacting the premix, including the amine composition of the invention, with the isocyanate to form the polyurethane composition. The forming of the polyurethane composition includes combining an isocyanate component with the premix using conventional equipment and processes such as those described in DOW POLYURETHANES Flexible Foams by Ron Herrington and Kathy Hock, Dow Plastics 1997. The components are combined for a predetermined duration (for example, about 6 seconds), at a predetermined blade rotation speed (for example, about 6,000 revolutions per minute), or a combination thereof. Alternatively, the forming of the polyurethane composition includes combining an isocyanate component with the premix utilizing spraying foam equipment which consists on contacting all the components at high pressure in a mixing head of a spraying machine.

In one embodiment, the isocyanate component is combined with the premix composition at or about a stoichiometric ratio. In one embodiment, the stoichiometric ratio is based upon an NCO index. The NCO index is the number of equivalents of the isocyanate, divided by the total number of equivalents of active hydrogen, multiplied by 100 (for example, based upon an NCO index being [NCO/(OH+NH)] *100). The polyurethane composition includes the NCO index being within a predetermined range. In one embodiment, the predetermined range is between about 20 and about 500. In one embodiment, where the polyurethane composition is used for producing a spray foam application, the range is between about 20 and about 500. For other applications, the NCO index can range from about 50 to about 300 about 80 to about 250 and about 90 to about 110. In one embodiment, the polyurethane composition is used with a trimerization catalyst to produce polyisocyanurate foams use in foam laminates and includes a range suitable for the use.

The isocyanate component includes any suitable organic isocyanate compound. Suitable organic isocyanate compounds include, but are not limited to, at least one of hexamethylene diisocyanate (HDI), phenylene diisocyanate (PDI), toluene diisocyanate (TDI), 4,4'-diphenylmethane diisocyanate (MDI), isophoronedi-isocyanate (IPDI), or combinations thereof. In one embodiment, the isocyanate component includes 2,4-TDI, 2,6-TDI, or a combination thereof. In one embodiment, the isocyanate component includes, by weight, about 80% 2,4-TDI and about 20% or a remainder 2,6-TDI. In one embodiment, the isocyanate component includes crude MDI, such as, a mixture of about 60% 4,4'-MDI and/or a stoichiometric amount along with other isomeric and analogous higher polyisocyanates. Other suitable isocyanates are shown and described in U.S. Pat. No. 4,394,491, which is hereby incorporated by reference in its entirety.

In one embodiment, the premix includes, by weight, at least about 20% of polyol between about 0.5% and about 10% of surfactant, between about 1% and about 30% being the blowing agent component, between about 0.5% and about 4% being the crosslinking component, between about 0.25% and about 15% being the catalyst composition, with the amount of the isocyanate component being based upon the NCO index being between about 20 and about 500. In a further embodiment, the polyol component includes polyether polyol, a natural oil polyol and/or a polyester polyol. In one embodiment, the polyether polyol has an average molecular weight between about 500 and about 20,000 and/or a hydroxyl number between about 400 and about 10 and more preferably an average molecular weight between 2000 and 5000 and/or hydroxyl number between about 50 and about 20.

In one embodiment, the premix include(s) about 100 pphp of the polyol component (for example, about 70 pphp being a polyester polyol and/or about 30 pphp being a Mannich polyol), about 2.0 pphp being the surfactant component, about 1.5 pphp being water, and the isocyanate component having an NCO index of about 180. The premix also include(s) the catalyst composition of the invention. In a further embodiment, the premix include(s) about 30 pphp of the flame retardant (for example, tris-(2-chloropropyl) phosphate), 20 pphp of blowing agent, 1.0 pphp metal catalyst and 0.10 pphp to 10 pphp trimerization catalyst.

The base polyol in the premix reacts with the isocyanate to produce the polyurethane foam composition. In one embodiment, the base polyol is a polyether polyol. Suitable polyether polyols are shown and described in WO 03/016373 A1, WO 01/58976 A1, WO 04/060956 A1, WO 03/016372 A1, and WO 03/055930 A1, each of which are hereby incorporated by reference in their entirety. In one embodiment, the polyether polyols are poly(alkylene oxide) polymers, such as, poly(ethylene oxide), poly(propylene oxide), and/or copolymers with terminal hydroxyl groups derived from polyhydric compounds (for example, diols and triols). In one embodiment, the diols and triols utilized are ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, other suitable low molecular weight polyols, or combinations thereof. In one embodiment, the polyether polyol is or includes polyhydroxy-terminated acetal resin, hydroxyl-terminated amine, hydroxyl-terminated polyamine, or a combination thereof. In one embodiment, the base polyol is or includes polyalkylene carbonate-based polyols, phosphate-based polyols, or combinations thereof.

In one embodiment, the base polyol comprises a single high molecular weight polyether polyol. In another embodiment, the base polyol comprises a mixture of high molecular weight polyether polyols, each having a different molecular weight or different chemical composition. In this embodiment, the base polyol comprises di-functional and tri-functional materials, such as, but not limited to, polyethylene glycol, polypropylene glycol, glycerol-based polyether triols, trimethylolpropane-based polyether triols, other similar compounds or mixtures, or combinations thereof.

In one embodiment, the polyurea modified polyol is formed by the reaction of a diamine and a diisocyanate in the presence of the starting polyol. In this embodiment, the polyurea modified polyol includes polyurea dispersion. In one embodiment, the polyurea modified polyol is or includes polyisocyanate poly addition (PIPA) polyols, for example, formed in situ from a reaction of the isocyanate and an alkanolamine in the starting polyol.

In one embodiment, the base polyol is or includes a natural oil polyol. Generally, the natural oil polyols are less expensive and from renewable resources, thereby providing environmental benefits. The natural oil polyols include triglycerides of saturated and/or unsaturated acids having a carbon chain length between 12 and 24. The saturated acids are lauric acid, myristic acid, palmitic acid, steric acid, arachidic acid, lignoceric acid, or a combination thereof. The unsaturated acids are mono-unsaturated (for example, palmitoleic acid, oleic acid, or a combination thereof) and/or poly-unsaturated (for example, linoleic acid, linolenic acid, arachidonic acid, or a combination thereof). One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformylation followed by hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformylation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

In one embodiment, the natural oil polyol used as or in the base polyol is castor oil. The castor oil is a natural triglyceride of ricinoleic acid having low hydroxyl content.

In one embodiment, a natural oil or fat is modified to form the natural oil polyol. In this embodiment, epoxidized natural oil is reacted with a ring opening acid catalyst and a ring opener. The epoxidized natural oil is plant-based oil, such as epoxidized vegetable oil and/or epoxidized animal fat. Suitable epoxidized natural oils that are plant-based oils include, but are not limited to, soybean oil, corn oil, sunflower oil, olive oil, canola oil, sesame oil, palm oil, rapeseed oil, tung oil, cottonseed oil, safflower oil, peanut oil, linseed oil, or a combination thereof. Suitable epoxidized natural oils that are epoxidized animal fat are fish fat, tallow, lard, or a combination thereof. Other suitable epoxidized natural oils are shown and described in WO 06/116456 A1, which is hereby incorporated by reference in its entirety.

In one embodiment, the natural oil or the fat is modified by increasing hydroxyl content through chemical reaction at unsaturated sites and/or at ester functional groups. For example, in one embodiment, the unsaturated sites are hydroxylated via epoxidation/ring opening and/or hydroformylation/hydrogenation. In one embodiment, the ring opening of the epoxidized natural oil is with alcohol, water, and other compounds having one or more nucleophilic groups. In a further embodiment, the epoxidized natural oil is also oligomerized. In one embodiment, the hydroformylation/hydrogenation of the epoxidized natural oil is in a reactor (not shown) filled with a hydrogen/carbon monoxide mixture in the presence of a suitable catalyst (for example, cobalt, rhodium, or combinations thereof) to form an aldehyde that is hydrogenated in the presence of a cobalt catalyst or a nickel catalyst to form a polyol.

In one embodiment, ester functional groups in suitable reactants are modified by trans-esterification to introduce hydroxyl groups. In this embodiment, a suitable poly-hydroxyl containing substance and trans-esterification catalyst (for example, an alkali metal or alkali earth metal base or salt) produce the polyol of the natural oil or fat. The trans-esterification includes any suitable natural oil or partially hydrogenated oil. Suitable natural oils include, but are not limited to, soybean, corn, cottonseed, peanut, castor, sunflower, canola, rapeseed, safflower, fish, seal, palm, tung, olive oil, or combinations thereof. Suitable multifunctional hydroxyl compounds include, but are not limited to, lactose, maltose, raffinose, sucrose, sorbitol, xylitol, erythritol, mannitol, or combinations thereof.

In one embodiment, the polyol component includes polyols typically used for making rigid PIR/PUR (polyisocyanurate and/or polyurethane) foam. Such polyols include, but are not limited to, polyalkylene ether and polyester polyols. In one embodiment, the polyalkylene ether includes a poly (alkyleneoxide) polymer, such as, poly(ethyleneoxide) and poly(propyleneoxide) polymers and copolymers with terminal hydroxyl groups derived from polyhydric compounds including diols and triols, for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or combinations thereof. In another embodiment, the polyol component includes amine polyether polyols that can be prepared when an amine, such as ethylenediamine, diethylenetriamine, tolylenediamine, diphenylmethanediamine, triethanolamine, or the like, is reacted with ethylene oxide or propylene oxide. In one embodiment directed to spray foam formulation, the polyol component includes polyether polyols, thereby increasing reactivity of the polyurethane composition. In one embodiment, the polyether polyols are prepared by condensation of phenol with formaldehyde in the presence of hydroxyl-containing amines such as diethanolamine, ethanolamine, and the like.

In one embodiment, the polyol component includes a single high molecular weight polyether polyol. Additionally or alternatively, in one embodiment, mixtures of high molecular weight polyether polyols, such as mixtures of different multifunctional materials and/or different molecular weight or different chemical composition, are included in the polyol component.

In one embodiment, the polyol component includes a polyester polyol produced when a dicarboxylic acid is reacted with an excess of a diol, for example, adipic acid, phathalic acid, phthalic anhydride with ethylene glycol, diethylene glycol, polyethylene glycol, propylene glycol, dipropylene glycol, polypropylene glycol or butanediol, or when a lactone is reacted with an excess of a diol, such as, caprolactone with propylene glycol.

The total amount of polyol, including blends thereof, can range from about 10% to about 80%, about 20% to about 60% and about 30% to about 50 wt % of the pre-mix.

One aspect of the invention relates to a composition comprising a mixture comprising at least two inventive aldehyde scavengers, at least one catalyst and optionally at least one diluent. Examples of suitable catalyst comprise at least one member selected from the group consisting of a tertiary amine catalyst component is or includes a single tertiary amine catalyst or a combination of tertiary amine catalysts. The tertiary amine catalyst component is a non-fugitive tertiary amine catalyst. In one embodiment, the tertiary amine catalyst component is at a predetermined amount, such as, between about 0.1 pphp and about 20 pphp, between about 0, 1 pphp and about 10 pphp, between about 0.1 pphp and about 5 pphp, between about 0.1 pphp and about 0.5 pphp, greater than about 0.5 pphp, at about 0.4 pphp, or any suitable combination, sub-combination, range, or sub-range within.

In some cases, the tertiary amine catalyst component includes an isocyanate reactive group. In one embodiment, the tertiary amine catalyst component is or includes N, N-bis(3-dimethylaminopropyl)-N-isopropanolamine, N, N-dimethylaminoethyl-N'-methyl ethanolamine, N, N, N'-trimethylaminopropyl ethanolamine, N, N-dimethylethanolamine, N, N-diethylethanolamine N, N-dimethyl-N', N'-2-hydroxy(propyl)-1,3-propylenediamine, dimethylaminopropylamine, (N, N-dimethylaminoethoxy) ethanol, methyl-hydroxy-ethyl-piperazine, bis(N, N-dimethyl-3-aminopropyl) amine, N, N-dimethylaminopropyl urea, diethylaminopropyl urea N, N'-bis(3-dimethylaminopropyl)urea, N, N'-bis(3-diethylaminopropyl)urea; bis(dimethylamino)-2-propanol, 6-dimethylamio-1-hexanol, N-(3-aminopropyl) imidazole), N-(2-hydroxypropyl) imidazole, and N-(2-hydroxyethyl) imidazole, or a combination thereof. Additionally or alternatively, in one embodiment, the tertiary amine catalyst component is or includes the blowing catalyst component. For example, in one embodiment, the tertiary amine catalyst component is or includes 2-[N-(dimethylaminoethoxyethyl)-N-methylamino] ethanol, N, N-dimethylaminoethyl-N'-methyl-N'-ethanol, dimethylaminoethoxyethanol, N, N, N'-trimethyl-N'-3-aminopropyl-bis(aminoethyl) ether, or a combination thereof. In one embodiment, the tertiary amine catalyst component is highly volatile and is not isocyanate-reactive. For example, in one embodiment, the tertiary amine catalyst component is a volatile gelling catalyst and is or includes diazobicyclooctane (triethylenediamine), 1,8-diazabicycloundec-7-ene, tris(dimethylaminopropyl) amine, dimethylaminocyclohexylamine, bis(dimethylaminopropyl)-N-methylamine, or a combination thereof. Additionally or alternatively, in one embodiment, the tertiary amine catalyst component is or includes a volatile blowing catalyst and is or includes bis-dimethylaminoethyl ether, pentamethyldiethylenetriamine, hexamethyltriethylenetetramine, heptamethyltetraethylenepentamine and related compositions, higher permethylated polyamines, 2-[N-(dimethylaminoethoxyethyl)-N-methylamino] ethanol and related structures, alkoxylated polyamines, imidazole-boron compositions, amino propyl-bis(amino-ethyl) ether compositions, or a combination thereof.

In one embodiment, the tertiary amine catalyst component is used in conjunction with a transition metal catalyst. For example, in one embodiment, the tertiary amine catalyst component is used with a metal complex component, such as, an organotin compound. In one embodiment, the organotin compound includes dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate.

Examples of suitable diluents comprise at least one member selected from the group consisting of water, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or combinations thereof. The amount of diluents can range from about 5 wt % to about 50 wt %, about 20 wt % to about 30 wt % and in some cases about 10 wt % to about 20 wt %. The composition of this aspect of the invention can be combined with other components in order to produce a polyurethane. For example, the composition of this aspect of this invention can be combined with other components in order to produce the previously described pre-mix that in turn is contacted with at least one isocyanate to produce a polyurethane foam.

The following Examples are provided to illustrate certain embodiments of the invention and do not limit the scope of the claims appended hereto.

Example 1

Foams may be made according to the methods known in the art using typical polyurethane formulations to which have been added a urethane catalyst comprising one or more alkyl tertiary amines. The amount of polyisocyanate used in polyurethane formulations according to the invention is not limited, but it will typically be within those ranges known to those of skill in the art. Exemplary ranges are given in the table, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]×100

In some embodiments of the invention, the aldehyde scavenger composition may be combined into a package with one or more polyester polyols, and optionally with one or more blowing agents and/or other additives commonly used in polyurethane formation. Examples of these other optional components have been listed previously, and they do not affect the basic nature of the invention. Such mixtures may subsequently be combined with an organic isocyanate to form polyurethane foam, optionally in the presence of other additives known in the art. In addition to making rigid spray foams, the invention may also be used to prepare other rigid foams that are commonly utilized for many industrial applications such as appliances, laminate panels for construction and insulation.

Polyurethane foams were prepared and tested in a conventional manner using the formulations shown below. The following formulation was used to prepare foams and study the emission of aldehydes. Foam samples were prepared using the formulation shown below in Table 1. The polyurethane foam samples were prepared with mixing conditions below.

The premix components (premix means all the components except for MDI) were mixed for about 10 seconds at about 6,000 RPM using an overhead stirrer fitted (Premier Mill Corporation Dispensator Series 2000 Model 89) with a 2 in (5.1 cm) diameter stirring paddle and allowed to cool to about 5° C. before mixing with the corresponding amount of isocyanate (Table 1) using a mechanical agitator (Premier Mill Corporation Dispensator Series 2000 Model 89) in a two litter plastic container. The aldehyde emission was done using the GM test method GMW 15635-2012 (GM). This test involves placing the foam sample of dimension 40 mm width×100 mm length on a hook hanging from the bottle cap of a PE bottle containing 50 mL of water. The foam is placed 40 mm from the water surface. The bottle containing the sample is heated for 3 h at 60° C. The aldehydes emitted are dissolved into the water and the concentration of each is determined by HPLC by comparison with known standards. The results are expressed in ug/g foam sample. This method is used for determining the aldehydes emitted from samples containing no scavenger (control) and with the added scavenger.

TABLE 1

| + Formulation component | Mass |
|---|---|
| Polyol: GEP828 (triol 6000) | 100 |
| Cell Opener: CP1421 | 3 |
| Silicone Surfactant: DC2525 | 1 |
| Crosslinker: DEOA-LF | 0.9 |
| Blowing Agent: Added Water | 2.83 |
| Gelling Catalyst: NE1070 | 1.1 |
| TMAPBAEE | 0.2 |
| Isocyanate: MDI-3133 (32.5 NCO %) Index = 100 | 52.9 |
| Inventive Aldehyde scavenger | 1.0 |

Polyol GEP 828 is a standard polyether polyol supplied by Sinopec Shanghai Gaoqiao Company with an average functionality=3 and an approximate MW=6000. VORANOL®CP1421 is a glycerol ethoxylated-propoxylated polyether polyol supplied by Dow Chemicals and normally used for the production of soft flexible foams as well as a cell opening agent for molded foam. DABCO® DC2525 is a silicone surfactant stabilizer supplied by Air Products and Chemicals. DABCO® DEOA-LF is a 85% solution of diethanolamine in water cross-linker supplied by Air Products and Chemicals. DABCO®NE1070 is an amine catalyst composed of a mixture of mono- and bis(dimethylaminopropyl)-urea supplied by Air Products and Chemicals. TMAPBAEE is N, N, N'-trimethyl-N'-3-aminopropyl-bis(aminoethyl) ether. Desmodur®3133 is an isocyanate supplied by Bayer composed of a mixture of 4,4'-MDI, 2,4-MDI and PMDI with average NCO content of approximately 32.5% by weight.

Example 1

Polyurethane samples prepared as described above were tested by a standard 10 L bag method (Q/BYD-1901.771-2012 (BYD)). This test method was performed as follows:

A foam sample of 80×100 mm in size was placed into a 10 L Tedlar® bag. This bag was placed into the sealed test chamber. The bag is equipped with a Teflon® valve, and Teflon tubing which is connected to a aldehyde collection cartridge (containing silica gel coated with dinitrophenyl hydrazine, DPNH) and a vacuum pump. The Teflon valve, Teflon tube, collection cartridge and vacuum pump are located outside of the test chamber. With the collection cartridge disconnected the air in the bag is evacuated and filled with 2 L of nitrogen. The chamber is then heated to 60° C. and kept for 2 h after which the first 100 ml of nitrogen is pumped out of the sample bag. The collection cartridge is then mounted to the pump and the aldehyde is pumped into the collection cartridge. The aldehyde collected in the collection cartridge is analyzed by a Waters HPLC using $H_2O/CH_3CN$ as the mobile phase and a flow rate of 1 cc/m in on a Zorbax® ODS column with column temperature of 40° C. and a UVNIS detector at 360 nm.

The results of the aldehydes emission by this method are shown in Table 2.

TABLE 2

Test Method: 10 L bag method (Q/BYD-1901.771 = 2-12 (BYD))

| Additive | Additive use level pphp | Formaldehyde emission ($\mu g/m^3$) | Acetaldehyde emission ($\mu g/m^3$) | Acrolein emission ($\mu g/m^3$) |
|---|---|---|---|---|
| Control | 0 | 198 | 82 | ND |
| Phenol | 0.3 | 60 | ND | ND |
| nonylphenol | 0.3 | 155 | 70 | ND |
| control | 0 | 178 | 102 | 82 |
| aminosiloxane | 1 | 175 | 155 | 82 |
| trihydroxybenzene | 1 | ND | 65 | ND |
| Control | 0 | 150 | 120 | 128 |
| N,N'-Bis-(3-aminopropyl)-propane1,3-diamine | 0.2 | ND | 102 | ND |
| N,N'-Bis-(3-aminopropyl)-propane1,3-diamine | 0.4 | ND | 68 | ND |
| Control | 0 | 272 | 34.5 | ND |
| $N^1$-{2-[2-(3-Aminopropylamino)-ethylamino]-ethyl}-propane-1,3-diamine | 0.6 | 26 | ND | ND |
| N,N',N''-Tris-(3-aminopropyl)-4-aminopropyl-1,8-octanediamine | 0.4 | ND | ND | ND |
| $N^1$-[2-(3-Aminopropylamino)-ethyl]-propane-1,3-diamine. | 0.4 | ND | 60 | ND |
| TEPA | 0.35 | ND | 194 | ND |
| 1-Benzyl-1,3-propanediamine | 0.4 | 194 | ND | ND |

ND = non detect, method detection limit = 50 $g/m^3$

Example 2

Polyurethane samples prepared as above were also tested by a standard 10 L bag method (NES 0402; method # 2 by Nissan Motor Co). This testing method was performed as follows:

A foam sample of 80×100 mm in size was placed into a 10 L Tedlar bag. This bag was placed into the sealed test chamber. The bag is equipped with a Teflon valve, and Teflon tubing which is connected to a aldehyde collection cartridge (containing silica gel coated with dinitrophenyl hydrazine, DPNH) and a vacuum pump. The Teflon valve, Teflon tube, collection cartridge and vacuum pump are located outside of the test chamber. With the collection cartridge disconnected the air in the bag is evacuated and filled with 2 L of nitrogen. The chamber is then heated to 65 and kept for 2 h after which the first 100 ml of nitrogen is pumped out of the sample bag. The collection cartridge is then mounted to the pump and the aldehyde is pumped into the collection cartridge. The aldehyde collected in the collection cartridge is analyzed by a Waters® HPLC using $H_2O/CH_3CN$ as the mobile phase and a flow rate of 1 cc/m in on a Zorbax ODS column with column temperature of 40° C. and a UVNIS detector at 360 nm.

TABLE 3

Test Method: 10 L bag method (NES0402 method #2 by Nissan Motor Co.)

| Aldehyde Additive | Additive use level (pphp) | Formaldehyde emission ($\mu g/m^3$) | Acetaldehyde emission ($\mu g/m^3$) | Acrolein emission ($\mu g/m^3$) |
|---|---|---|---|---|
| Control | 0 | 68 | 42 | ND |
| Melamine | 0.8 | 47 | 37 | ND |
| Isotridecycloxypropyl-1,3-diaminopropane (Tomamine® DA-17 | 0.7 | 10 | 33 | ND |
| Cardanol | 1 | 15 | 24 | ND |
| Ammonium carbonate | 0.2 | 14 | 44 | ND |
| 1,3-cyclohexanedione | 0.12 | 14 | 44 | ND |
| 1,2-cyclohexanediamine | 0.95 | 35 | 38 | ND |

Method detection limit 10 $\mu g/m^3$

Example 3

Polyurethane samples are prepared as above except that a mixture of aldehyde scavengers (containing equal weights of each scavenger as a solution of each other or suspended into each other) from Table 4 is used to reduce aldehyde emissions. Two, three and four individual scavengers are combined for the preparation of the foam samples. These samples are also tested by a standard 2 L bag method (NES 0402; method #2 by Nissan Motor Co). This testing method is performed as follows: A foam sample of 80×100 mm in size is placed into a 10 L Tedlar bag.

This bag is placed into the sealed test chamber. The bag is equipped with a Teflon valve, and Teflon tubing which is connected to a aldehyde collection cartridge (containing silica gel coated with dinitrophenyl hydrazine, DPNH) and a vacuum pump. The Teflon valve, Teflon tube, collection cartridge and vacuum pump are located outside of the test chamber. With the collection cartridge disconnected the air in the bag is evacuated and filled with 2 L of nitrogen. The chamber is then heated to 60° C. and kept for 2 h after which the first 100 ml of nitrogen is pumped out of the sample bag. The collection cartridge is then mounted to the pump and the aldehyde is pumped into the collection cartridge. The aldehyde collected in the collection cartridge is analyzed by a Waters® HPLC using $H_2O/CH_3CN$ as the mobile phase and a flow rate of 1 cc/min on a Zorbax ODS column with column temperature of 40° C. and a UV/VIS detector at 360 nm. The results are shown in Table 4.

TABLE 4

Test Method: 10 L bag method (NES0402 method #2 by Nissan Motor Co.)

| Aldehyde Additive | Additive use level (pphp) | Formaldehyde emission ($\mu g/m^3$) | Acetaldehyde emission ($\mu g/m^3$) | Acrolein emission ($\mu g/m^3$) |
|---|---|---|---|---|
| Control | 0 | 119 | 119 | ND |
| trihydroxybenzene and N,N'-Bis-(3-aminopropyl)-propane1,3-diamine | 1.2 | 110 | 58 | ND |

TABLE 4-continued

Test Method: 10 L bag method (NES0402 method #2 by Nissan Motor Co.)

| Aldehyde Additive | Additive use level (pphp) | Formaldehyde emission ($\mu g/m^3$) | Acetaldehyde emission ($\mu g/m^3$) | Acrolein emission ($\mu g/m^3$) |
|---|---|---|---|---|
| Isotridecycloxypropyl-1,3-diaminopropane (Tomamine® DA-17) and trisaminotriol | 0.4 | 30.5 | 73 | ND |

Method detection limit 10 $\mu g/m^3$

While the invention has been described with reference to certain aspects or embodiments, it will be understood by those skilled in the art that various changes may be made and equivalents may be substituted for elements thereof without departing from the scope of the invention. In addition, many combinations and modifications may be made to adapt the teachings of the invention without departing from the essential scope thereof. Therefore, it is intended that the invention not be limited to the particular embodiment disclosed for carrying out this invention, but that the invention will include all embodiments falling within the scope of the appended claims.

The following is claimed:

1. A composition comprising a mixture of at least two aldehyde scavengers, at least one polyol, water and at least one amine catalyst; wherein the mixture of at least two aldehyde scavengers comprises at least one polyamine bearing a 1,3-propanediamino function; wherein the at least one polyamine is selected from the group consisting of N,N'-diphenylpropanediamine, 1-benzyl-1,3-propanediamine, isotridecyloxypropyl-1,3-diaminopropane, dodecyloxypropyl-1,3-diaminopropane, hexyloxypropyl-1,3-diaminopropane, N,N',N"-tris-(3-aminopropyl)-4-aminopropyl-1,8-octanediamine, and N'-{2-[2-(3-amino-propylamino)-ethylaminoFethyl}-propane-1,3-diamine; wherein the mixture of the at least two aldehyde scavengers further comprises at least one member selected from the group consisting of phenol, substituted phenol compounds, a 1,3-dicarbonyl compound, melamine, a 1,2-diaminocycloalkane, and an ammonium salt; and wherein the mixture of at least two aldehyde scavengers is present in said composition in an amount of about 0.05 parts per hundred parts of the at least one polyol to 2.0 parts per hundred parts of the at least one polyol.

2. The composition of claim 1 wherein the mixture of at least two aldehyde scavengers comprises at least one member selected from the group consisting of phenol, cardanol, 2-methylphenol, 4-methylphenol, 4-t-butylphenol, 2-methoxyphenol, 4-methoxyphenol, phloroglucinol, and 4-nonylphenol.

3. The composition of claim 1 wherein the mixture of at least two aldehyde scavengers comprises at least one member selected from the group consisting of diethyl malonate, dimethyl malonate, 2,4-pentanedione, 1,3-cyclohexanedione malonamide, and N,N,N'N'-tetramethylmalonamide.

4. The composition of claim 1 wherein the mixture of at least two aldehyde scavengers comprises melamine.

5. The composition of claim 1 wherein the mixture of at least two aldehyde scavengers comprises 1,2-diaminocyclohexane.

6. The composition of claim 1 wherein the mixture of at least two aldehyde scavengers comprises at least one member selected from the group consisting of ammonium carbonate, ammonium chloride, and ammonium nitrate.

7. The composition of claim 1 further comprising at least one additional diluent other than water.

8. A method for producing polyurethane foam, the method comprising providing the composition of claim 1, and contacting with at least one polyisocyanate, thereby reacting the at least one polyol and the at least one polyisocyanate to produce the polyurethane foam.

9. A polyurethane foam produced by the method of claim 8.

10. The polyurethane foam of claim 9 wherein the polyurethane foam has formaldehyde emissions below about 2 $\mu g/m^3$ and aldehyde emissions below about 0.35 $\mu g/m^3$.

11. The polyurethane foam of claim 9 wherein the polyurethane foam has no acetaldehyde or formaldehyde emissions originating therefrom.

* * * * *